F. D. BUTLER.
INTERNAL COMBUSTION ENGINE.
APPLICATION FILED SEPT. 14, 1914.
1,169,235.
Patented Jan. 25, 1916.
5 SHEETS—SHEET 1.
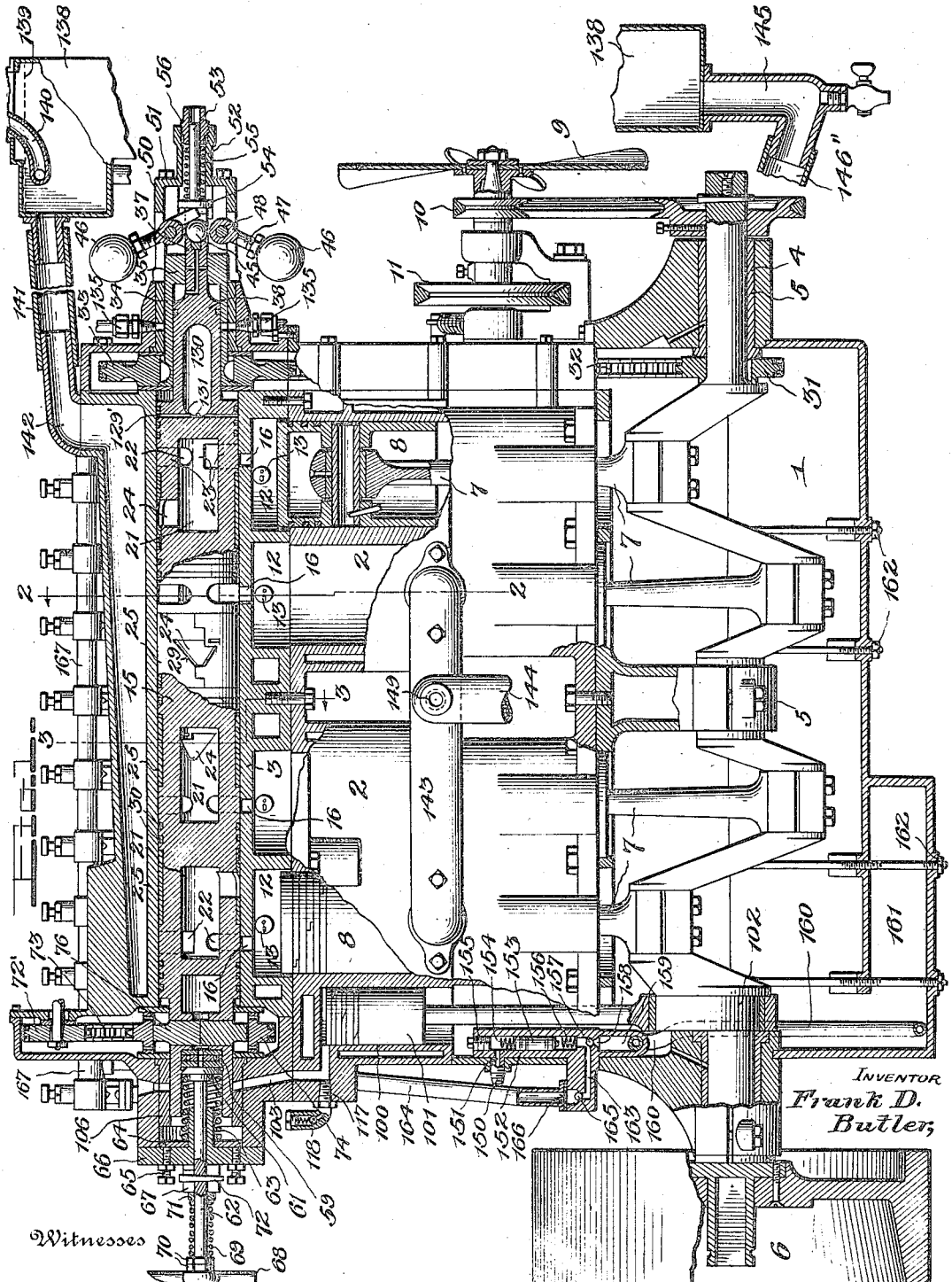
Witnesses
Chas. L. Griestauer.
Wm H. Gross
Inventor
Frank D. Butler,
By La Porte & Brown
Attorney

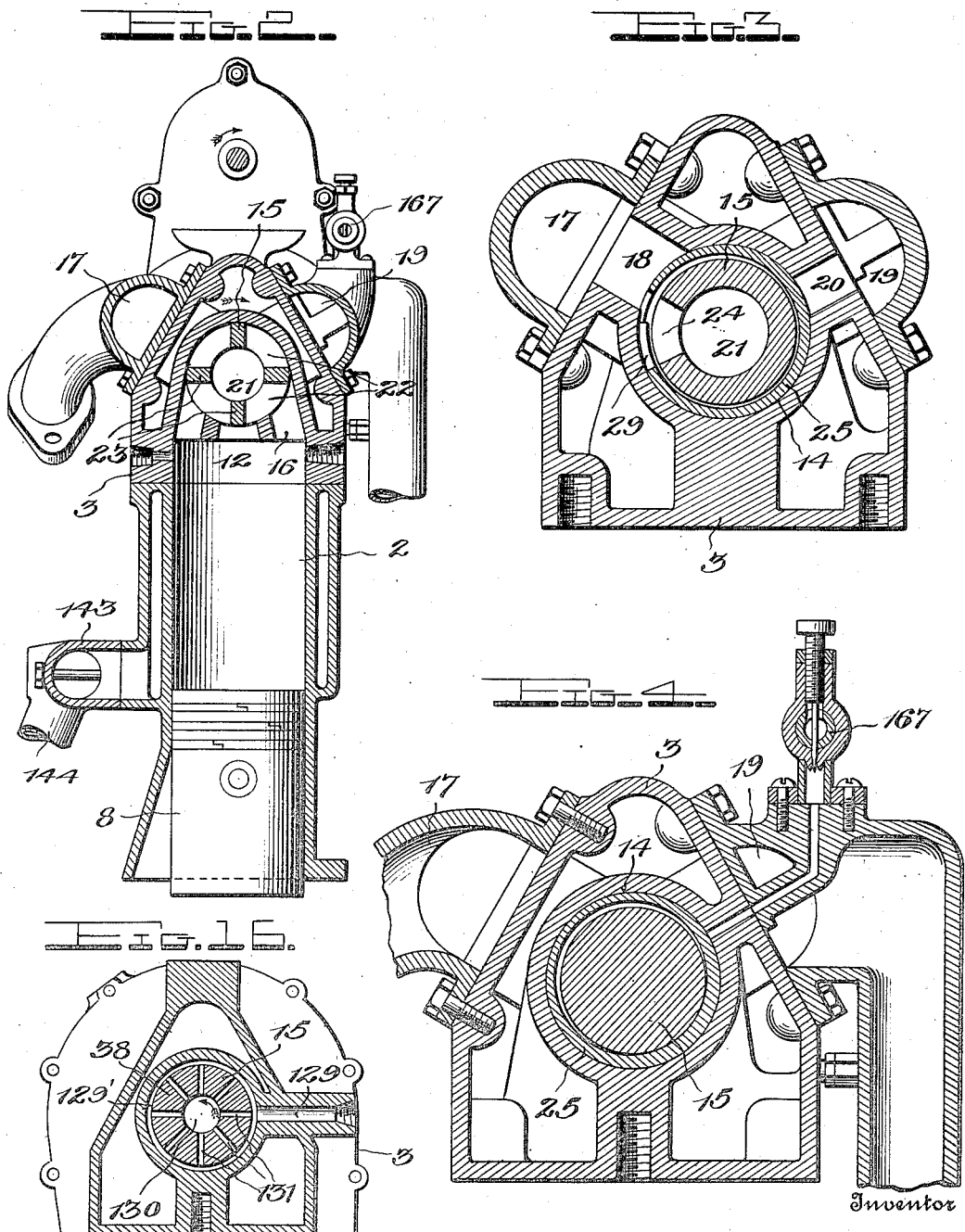

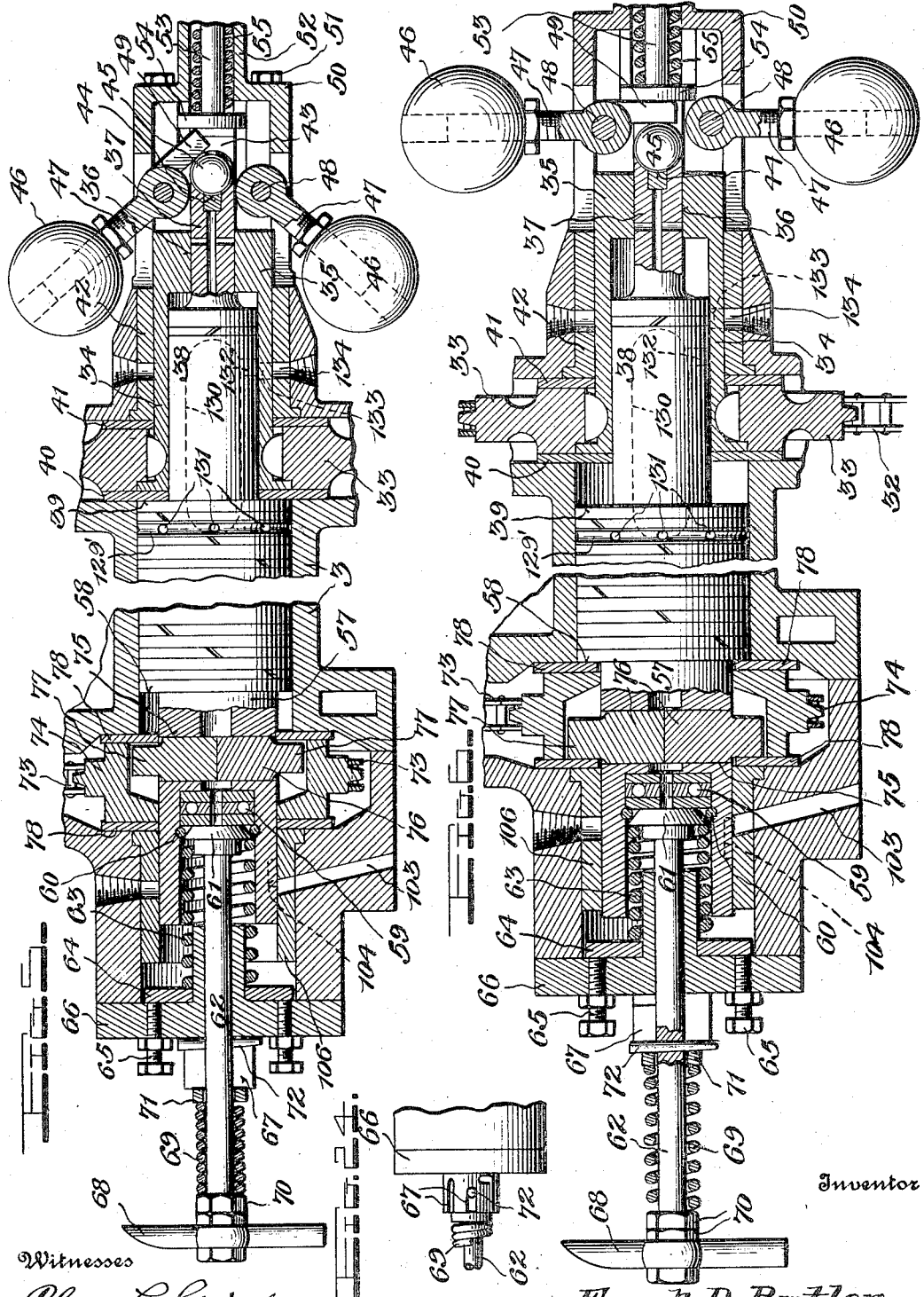

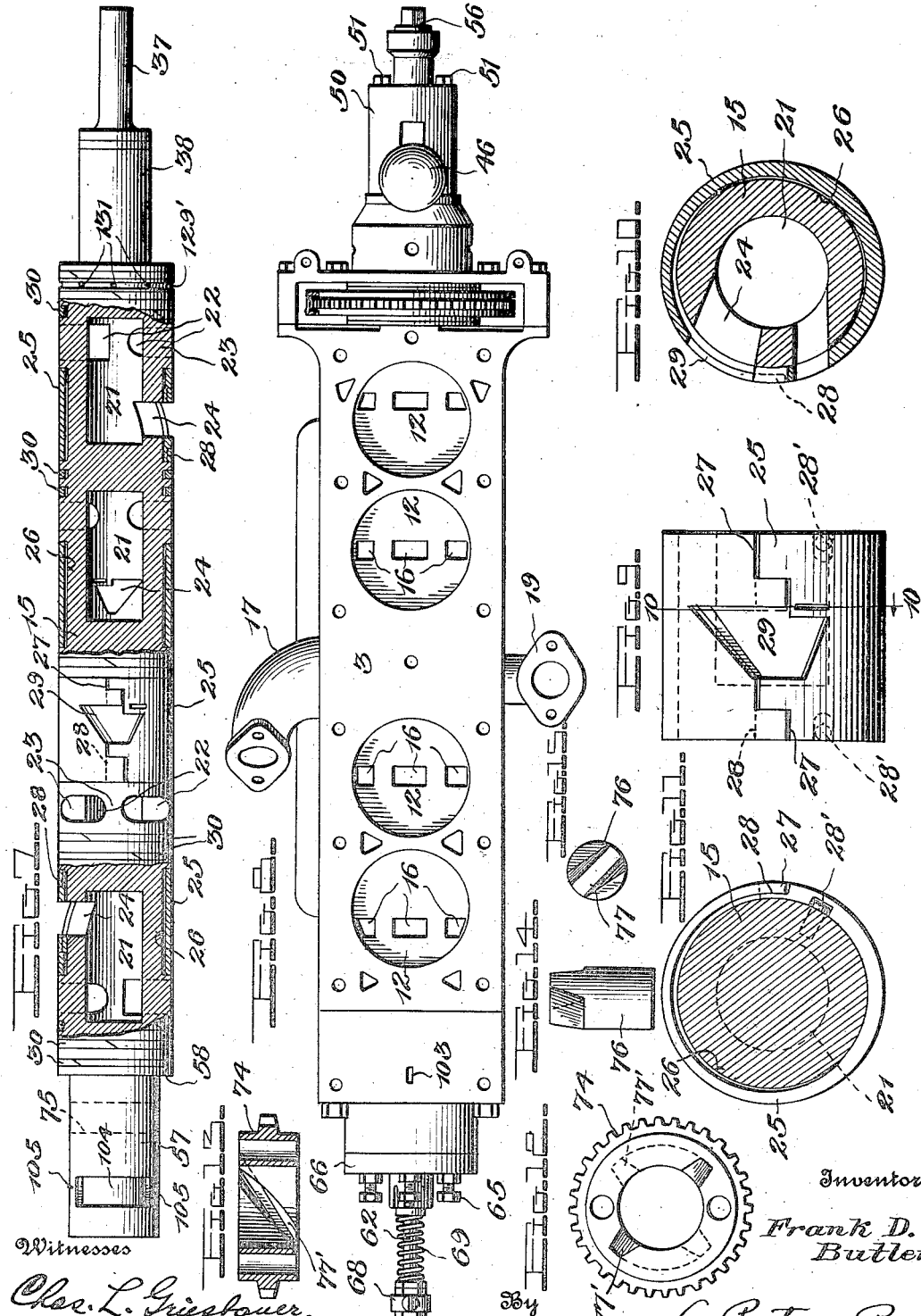

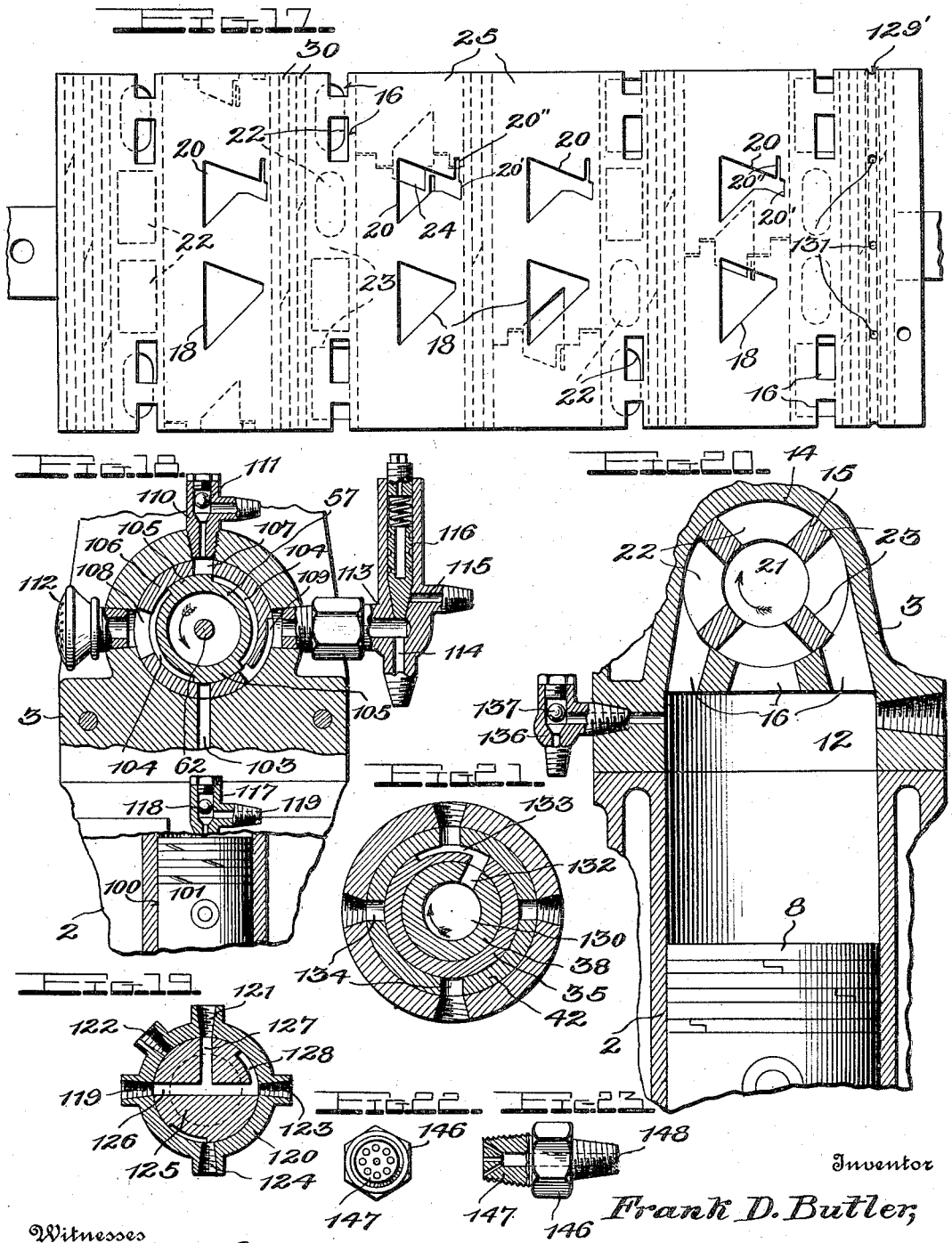

UNITED STATES PATENT OFFICE.

FRANK D. BUTLER, OF BURLINGTON, IOWA.

INTERNAL-COMBUSTION ENGINE.

1,169,235.     Specification of Letters Patent.     Patented Jan. 25, 1916.

Application filed September 14, 1914. Serial No. 861,605.

*To all whom it may concern:*

Be it known that I, FRANK D. BUTLER, a citizen of the United States, a resident of Burlington, in the county of Des Moines and State of Iowa, have invented new and useful Improvements in Internal-Combustion Engines, of which the following is a specification.

My invention relates to improvements in internal combustion engines, and is particularly directed to the provision of a rotary valve structure and means for shifting the same so as to vary the timing of the operation of the valve ports automatically.

A further object is the provision of an automatic spark advance.

A further object is the provision in connection with the automatic timing of the spark, of manually controlled means for regulating and setting the same.

A further object is the provision of a rotary valve having the ports of peculiar shape, said valve being shiftable so as to vary the timing of the operation of said valves relative to the position of the pistons in the cylinders during the various cycles of the engine.

Further objects of my invention include improvements in various details of construction whereby an efficiently operating mechanism is provided for the purposes hereinafter set forth.

To the accomplishment of the foregoing and such other objects as may hereinafter appear, my invention consists in the combination, construction and arrangement of parts hereinafter described, and then sought to be defined in the appended claims, reference being had to the accompanying drawings forming a part hereof, and which shows merely for the purpose of illustrative disclosure, a preferred embodiment of my invention, it being understood that various changes may be made in practice within the scope of the claims, without digressing from my inventive idea.

In the drawings—Figure 1 represents a view partially in side elevation and partially in section, of an engine constructed according to my invention, it being understood that the proportions are varied so as to facilitate convenient disclosure; Fig. 2 is a vertical section through the upper part of a cylinder and the valve structure; Fig. 3 is an enlarged vertical section through another portion of the valve casing body, and rotary valve, disclosing ports. Fig. 4 is a similar view taken through still another portion, disclosing rotary valve and oiling system; Fig. 5 is a longitudinal section of the valve and particularly, its controlling mechanism shown in a retarded position; Fig. 6 is a similar position, parts being shown in advanced position; Fig. 7 is a partially horizontal section and plan of the valve body; Fig. 8 is a plan view of the valve casing; Fig. 9 is an elevation of one of the valve rings mounted on the valve body; Fig. 10 is a vertical cross section taken on substantially line 10—10 of Fig. 9; Fig. 11 is another vertical section through the valve body, showing the end of the ring in elevation; Fig. 12 is a side elevation of the magneto advance sprocket; Fig. 13 is a cross section; Figs. 14 and 15 are side elevation and top plan views respectively, of the magneto advance plug; Fig. 16 is a cross section through the rotary valve and casing showing the air connection for distributing the air for motor starting; Fig. 17 is a diagrammatic view of the rotary valve and its casing, showing the relative arrangement and operation of the ports, the valve being in full advance position; Fig. 18 is a vertical cross section through the upper portion of the air pump cylinder and through the end of the rotary valve controlling the distribution of the air; Fig. 19 is a cross section of the rotary hand controlling valve for the air distributing system; Fig. 20 is a vertical section through the upper portion of a cylinder showing the connection for air starting; Fig. 21 is a cross section taken through the air supply nipples on the right hand side of Fig. 1, showing the control of the air distribution for starting purposes; Figs. 22 and 23 are detail views of a spray nipple, and Fig. 24 is a detail view of the adjusting means to regulate the tension of the resilient means controlling the movement of the valve body.

It is essential for proper operation of an internal combustion engine, that the time of the registering of the ports for the inlet and exhaust of the gases, be varied according to the speed of the engine, it being understood that in motor braking, the inlet valve port should close just a little past the bottom center of the piston. For slow or low running piston speeds, this port should close a little later and still later for high running speeds. This time should be later still for proper adjustment for cranking. Similarly, an extreme early opening of the exhaust valve, that is in advance of the bottom center of the piston, is advisable at high piston speed, a later opening but still at a slight advance at the bottom center of the piston is best for efficient results at a low piston speed and a retard or lagging opening of the exhaust valve, that is, after the bottom center, produces back pressure necessary in motor braking. Also ignition should be similarly varied, an early or advance ignition being advisable for fast speeds, top center ignition for slow speeds, after center or lagging or retarding ignition for cranking and an extreme lag or retard for the back pressure in motor braking. It is with the knowledge of these conditions in mind, that my invention was evolved, it being for the purpose of producing those results whereby the most efficient operation of the motor is attained.

Referring now to the drawings, and to Fig. 1 particularly, the numeral 1 designates the crank casing having mounted thereon, the cylinders 2 which are cast en bloc, as shown, and on which is mounted the cylinder heads and rotary valve casing 3, which is cast integral. The crank shaft 4 is suitably journaled as at 5 having the fly wheel 6 and the piston rods 7 connected thereto, which operate the piston heads 8 in the cylinders 2. The fan is indicated at 9, driven by means of the belt and pulley connection 10. 11 is the belt and pulley connection for driving the generator, as is well understood.

The cylinder head and valve casing 3, are provided with openings or recesses, corresponding to and adapted to register with the cylinders so as to provide the combustion chambers 12, the spark plugs 13 being mounted therein, as is well understood. This casing 3 is provided with an elongated horizontally extending bore 14, which is adapted to receive the rotary valve 15, suitable ports or passages 16 extending through the lower wall of this casing from each of said combustion chambers 12. This valve casing has a suitable connection with the exhaust manifold 17 by means of the ports 18 and with the inlet manifold 19, by means of the ports 20, as is well understood. Communication between the cylinders and these exhaust and inlet manifolds, is controlled by means of the rotary valve member 15, which is positioned in the bore 14 of said casing 3. This valve member 15 is of peculiar construction, and will now be described.

Referring to Figs. 1, 7, 9, 10 and 11, particularly, it is seen that this valve member 15 comprises an elongated cylindrically shaped member, having a plurality of cylindrical chambers 21, provided therein, which correspond to the cylinders of the engine. These chambers are in communication with the cylinders by means of the ports 16, previously referred to, and the ports 22, which are merely separated by suitable struts or bridge pieces 23, so that the communication between said chambers 21 and the cylinders, is not interfered with in any way. These chambers may be therefore termed or considered part of the combustion chamber of the cylinders, as they are in constant communication therewith. This valve member 15 is also provided with the inlet and exhaust ports 24, one for each of said chambers 21. This inlet or exhaust port is of peculiar shape, see Fig. 7, particularly, being an irregular trapezium, one of the nonparallel sides being inclined considerably more than the other nonparallel side. Coöperating with each of the chambers 21 in the valve body, and with the exhaust and inlet openings 24, are the rings 25 which fit in the cut out portions 26 on the outside of said valve body and have the complementary edges 27, which overlap, as indicated at 28', Fig. 11, the rings being held so as to rotate with the valve body by means of the pin and slot connection 28. Each of these rings has an opening 29 therein, corresponding in size and shape to the opening 24 in the valve body. Suitable packing rings 30 are utilized at various intervals on the outside of said valve body, so as to prevent any leakage.

The ports 18 to the exhaust manifold 17 and the ports 20 to the inlet manifold 19, are of peculiar shape, so as to coöperate with the ports 24, whereby the timing of exhaust and inlet of gases may be varied, as well as the area of the column of gases admitted or discharged. The exhaust port 18 is of substantially triangular form, having its base substantially parallel to the longer parallel side of the port 24, but located oppositely to the same, so that when the ports are in registration and the ports moved transversely relatively to each other, the area of the passage therethrough may be quickly varied. The inlet port 20 is of a general triangular shape, having its base in alinement with the base of the exhaust port, but having a peculiar neck or extension 20', extending from the apex, or what would be the apex of the triangle. This neck or extension 20' has the lateral annular extension 20''. The neck 20' of the inlet port extends slightly beyond the apex of the triangular exhaust port, as seen from a consideration of the drawings. This valve body 15 is adapted to rotate in the valve casing and is driven from sprocket 31 by means of chain 32 and sprocket 33, which is keyed on to the socket member 34, the head 35 of said socket member having a substantially oblong passage 36 therethrough, which is adapted to receive the extension 37 of the reduced portion 38 of the valve body 15, this extension being substantially oblong in cross section to fit said passage 36. It is to be understood that a shoulder 39 is formed in providing the reduced portion 38. A suitable washer 40 is interposed between the casing 3 of the valve and the sprocket 33 and end of the socket member 34, respectively, another washer 41 being positioned between the sprocket 33 and the bearing bushing 42.

The end of the extension 37 of the valve member 15 is split or bifurcated as at 43, and also provided with a socket 44 to receive the ball bearing 45. Weighted ball members 46 are provided on the arms 47 pivoted at 48, and having the overlapping extensions 49, which engage the ball member 45, so as to move said valve member 15 longitudinally of itself, this movement depending upon the speed with which the sprocket 33 rotates the valve member, this, of course, being determined by the speed of the engine itself.

Secured to the end of the socket member is the housing 50, by means of the cap screws 51, this housing having a tubular member 52 provided to receive the plunger 53, which has the disk or bearing portion 54, and which is normally held against said overlapping extensions 49 of the governor members by means of the spring 55, bearing against said member 54 and the adjusting plug or member 56. The other end of the valve member is provided with a reduced portion 57, thereby forming a shoulder 58, this reduced portion being tubular, and adapted to receive the end thrust bearing members 59, the retaining spring 60 being seated in a suitable recess in the internal surface of said tubular portion. The head 61 of a plunger 62 is forced against said end thrust bearing members, by means of spring 63, which engages the washer or plate 64, which is adjusted by means of set screws 65, passing through the end portion 66 of the valve casing, which end portion has the extension 67, which will be described in detail later. The plunger 62 passes therethrough, being provided on its outer extremity, with a pointer member 68, and having the spring member 69 interposed between the adjusting nuts 70 and the collar 71. The extension 67 is provided with a plurality of slots, as indicated by the difference in position of the pin 72, in Fig. 1, and Figs. 5 and 6, and shown in Fig. 24 these slots being of different lengths and utilized for the purpose of setting the various parts of the mechanism, so that the valve can only be operated to certain positions so as to cause certain results only. This is a hand control, so that part of the automatic control may be eliminated, as desired.

The parts which have been described, provide the means whereby the operation of the valves including the timing of the operation of the inlet and exhaust valves, may be controlled according to the speed of the engine, it being well understood in this art, that with a low speed, less gas and less cross sectional area of the exhaust port is required, the reverse being true in the case of higher speeds. In view of the peculiar shape of the ports and their relative arrangement, it is seen that a shifting of the valve member within its casing, by means of the centrifugal control, will operate to increase or decrease the cross sectional area of the column of inlet or exhaust gases, and at the same time, will vary the timing of the establishing of communication between the exhaust and inlet and the combustion chamber of the cylinder. The spring and plunger construction 55 and 53 is for the purpose of holding the governor members 46 and 47 against dropping, and the spring and plunger construction 62, 63 and 69, is for the purpose of giving finer adjustment, so that in operating, most efficient results are produced. I also utilize this endwise movement of the rotary valve member to provide an automatic spark advance and retard, this being accomplished in the following manner: The magneto armature is driven by means of sprocket 72' and chain 73 from sprocket 74, which sprocket is rotated by means of the rotation of the valve body 15. In suitable recesses 75 in the valve body 15, are mounted the pins or lugs 76 which are provided with an edge curved to provide a portion of a worm shaped gear as at 77', see Figs. 14 and 15, which are adapted to mesh in a corresponding groove 77', see Fig. 2, on the inside of said sprocket wheel 74. Washers 78 are provided so as to hold the sprocket 74 against shifting, it being understood that the sprocket wheel 74 is rotated through the connection of the pins 76 and that when the valve member 15 is moved longitudinally, the pins, due to the engagement of their gear edges 77 with the grooves 77' in the sprocket, will cause a movement of the magneto armature so as to advance the timing of the spark or to retard the same as the case may be. This provides a very simple and efficient method of automatically controlling and regulating the spark. I also provide in connection with an engine constructed according to my invention, air compressing means for compressing air which is used in starting, for operating an oil pump and for water cooling, also for providing pressure in gasolene tank, and for tire pumping. 100 designates the air pump cylinder which is cast *en bloc* with the other cylinders having mounted therein, the piston 101 driven by means of eccentric 102 from the crank shaft. Port 103 affords communication between the upper portion of the cylinder and the rotary valve member 15, this member being provided with valve ports or grooves 104 having the air tight bridges 105 therebetween, see detailed views particularly Fig. 18.

Referring to Fig. 18, it is seen that in the bushing 106, are provided the ports 107, 108 and 109, the latter being in the form of an elongated groove, having a small inlet into the interior of said bushing. The port 107 has a connection by means of nipple 110 to the gasolene pressure tank, a suitable ball check valve 111 being provided therein to control the operation properly. The port 108 is in communication with the strainer 112 which communicates with the outer air so as to provide air for the pump. The port 109 communicates with the nipple member 113 which has two connections, one, 114, being for the oil pump and the other 115, being to the intake water manifold and being controlled by the check valve 116. Communicating with the lower portion of port 103, is the nipple 117 which has the ball check valve 118 and the connection 119 to the air tank, this connection 119 providing communication with the hand controlled valve 120, see Fig. 19, which has connection 121 for the air gage 122 to the tire pump, 123 to the air tank 124 to the air distributer for starting of the engine. The operation of these various devices is controlled by means of the rotary member 125 having the diametrical port 126 with the radial port 127 and the segmental groove 128 extending from one end of said diametrical port.

Connection is made from the connecting member 124 to the port 129 located in the valve casing toward the right hand end of Fig. 1, this port communicating with groove 129' in the outer surface of the rotary valve member, and which groove in turn, communicates with the chamber 130 in the reduced portion 38 of said member, by means of the ports 131, see Fig. 16. At the other end of this chamber 130, is provided the outlet port 132 which is adapted to register with port 133 in the socket member 34, see Figs. 5 and 6. Ports 134 are provided in the bushing member 42, one for each cylinder and have the nipple connection 135 communicating with the nipple member 136, which is connected to the upper end of each cylinder and has the ball check valve 137 therein, see Fig. 20. It is therefore evident, that provision is made for the passage of air from the air tank through the connection 123, port 127, port 126, connection 124, port 128, groove 129, ports 131 to chamber 130, thence through ports 132 and 133 and 134 as controlled by the rotation of the rotary member to the respective cylinders, so that by the operation of the rotary member 125, the engine may be started from air pressure. It is to be noted, that the port 132 registers with the port 133 in a retard position only and as shown in Fig. 5.

The numeral 138 designates the radiator which should be filled with water to the dotted lines 139, which fills all of the water manifold, water connections and motor, rotary valve and air pump jackets. 140 is the overflow pipe and 141 is the connection from the outlet manifold 142, 143 being the inlet manifold adapted to receive water through the connection 144 from the elbow member 145 at the lower portion of the radiator. The member 146, see Figs. 22 and 23, is in the form of a nipple having the larger end 147 and the smaller end 148, the larger end being provided with a plurality of perforations and adapted to be screwed into the intake water manifold 143 as at 149, see Fig. 1, the smaller nipple portion 148 being adapted to be connected to the nipple or member 115, previously described. It is therefore obvious that pressure will be admitted to the water manifold through the member 146, the nipple member 115 and the port in the member 113, on the up stroke of the piston 101, the check valve 116 being raised by the pressure of the air. This draws the water from the bottom of the radiator causing the lowering of the water in the top of the radiator, thereby creating a circulation, the compressed air separating from the water at the top of the radiator and passing out from the overflow pipe 140. The strainer holes in the larger end of the member 146, materially decrease the noise of the air and separates the air so as to form a mass of fine bubbles, whereby the heat is more readily extracted from the water.

As stated before, the air pump is utilized to operate the oil pump for the oiling system, the nipple member 114 being provided for connection with the oil pump, this connection being made at nipple 150, see Fig. 1, registering with the port 151 which enters the oil pump cylinder 152. This cylinder has the loose piston 153 therein, having the spring 154 above the same, the plug 155 closing the outer end. Spring 156 is provided in the lower end of the cylinder, the ball check valve 157 also being provided in the lower end, to control the passage of the oil through the small port 158, communicating with the elbow 159, to which oil is supplied from the tube or pipe 160, this tube or pipe drawing the oil from the bottom of the oil base 161. It is to be noted that different levels are provided for the cranks, and adjustments may be made by means of the bolt members 162. Port 163 extends laterally from the lower portion of the pump cylinder to a pipe or tube 164, ball check valve 165, and strainer 166 being provided therebetween. This pipe or tube 164 communicates with the pipe member 167 from which connections are made to the valves, and to the casings of the chain and sprockets, so that the oil is circulated throughout the engine.

During the operation of the air pump and on the down stroke of the piston, the ports of the rotary valve are so arranged as to cause a suction through the member 113 and in view of the check valve 116, the air is drawn through the nipple member 114 and the connection 150, so that the plunger is raised until the spring 154 hits the block 155. This raises the ball check valve 157, drawing oil from the oil base into the chamber under the plunger, the valve 165 being held on its seat. Now then, when the air pump piston starts up on its compression stroke, air pressure is forced through ports 103, 104, 109, 114 and 150, forcing plunger 152 downwardly, closing valve 157, and forcing the oil through valve 165 and strainer 166, throughout the system.

The latter half of the upstroke of the piston of the air pump forces air through check valve 118, hand rotary valve 125 to an air pressure tank for motor starting purposes. The inlet and outlet distribution of air to and from the air pump cylinder is controlled properly by the grooves 104 and bridge 105 on the end of the rotary valve body 15.

What I claim is:—

1. In an internal combustion engine and in combination with a crank shaft, pistons and cylinders thereof, a chamber or compartment communicating with the cylinders, a valve member mounted to rotate in said chamber or compartment, said valve member having a plurality of chambers or compartments therein, one being provided for each cylinder and in constant communication therewith, inlet and exhaust ports provided in said valve member to each of said chambers or compartments, means for rotating said valve member and for controlling its longitudinal position so as to vary the timing of the inlet and exhaust of the gases.

2. In an internal combustion engine and in combination with a crank shaft, pistons and cylinders thereof, a chamber or compartment having communication with each cylinder and having a rotatable valve member mounted therein, connections between said crank shaft and said valve member to rotate the same, said valve member having a plurality of chambers or compartments one for each cylinder and also an inlet and exhaust port for each of said chambers or compartments, corresponding inlet and exhaust ports being located in said first mentioned chamber or compartment and means for regulating the longitudinal position of said valve member whereby the timing of the inlet and exhaust is controlled.

3. In an internal combustion engine and in combination with the cylinders, pistons and crank shaft, a chamber or compartment having communication with each cylinder, an elongated valve member located in said chamber or compartment and having a plurality of chambers or compartments therein, one being provided for each cylinder and having constant communication therewith, means operated by the crank shaft for rotating the said valve member, said valve member having an inlet and exhaust port for each of said chambers or compartments and having resilient rings each having ports corresponding to said inlet and exhaust ports and adapted to fit said first mentioned chamber or compartment tightly, and means for controlling the longitudinal position of said valve member, whereby when the speed of the engine increases, the time of the inlet and exhaust of the gases will be advanced and vice versa.

4. In an internal combustion engine and in combination with the cylinders, pistons and crank shaft, a rotary valve member for controlling the inlet and exhaust of the gases, said valve member being rotated from said crank shaft, connections from said rotary valve member to drive the magneto, means for moving said rotary valve member longitudinally so as to vary the timing of the inlet and exhaust and also to vary the timing of the spark.

5. In an internal combustion engine and in combination with the cylinders, pistons and crank shaft, a rotary valve member for controlling the inlet and exhaust of the gases, said valve member being rotated from said crank shaft, connections from said rotary valve member to drive the magneto, means for moving said rotary valve member longitudinally so as to vary the timing of the inlet and exhaust and also to vary the timing of the spark, said connections comprising a chain and sprocket connection, said sprocket being driven by said rotary valve member and having worm like grooves on the inside of its hub and plug members connected to said rotary valve member and having correspondingly worm like edges to engage said grooves, whereby when the valve member is moved longitudinally the sprocket wheel will be rotated partially by means of the engagement of the plugs with the grooves therein.

6. In an internal combustion engine and in combination with the cylinders, pistons and crank shaft, oiling system and water cooling system, a rotary valve member for controlling the inlet and exhaust of the gases to and from the cylinders, said rotary valve being driven by connections from said crank shaft, an air compressing pump adapted to be driven by said crank shaft, connections from said air compressing pump to the cylinders so as to provide air starting means, and connections from said air compressing pump to said oiling system and to said water cooling system so as to maintain pressure therein.

7. In a reciprocating combustion engine, the combination with a series of cylinders and pistons operating therein, of a valve casing having a series of inlet ports and exhaust ports arranged about 120° apart, a valve rotatable in said casing and having a plurality of small combustion chambers or compartments, one of said compartments for each of said cylinders, said compartments being in constant communication with the combustion chambers of their respective cylinders by and through a series of ports in said valve and valve casing, said casing being integral with said cylinder combustion chambers, said valve member having mounted thereon a plurality of expansive rings, one ring for each of said cylinders, each ring containing a combined intake and exhaust port adapted to alternate in communication with said valve casing ports, whereby communication with said combustion compartments is afforded.

8. In a reciprocating combustion engine, the combination with a series of cylinders and pistons operating therein, a valve casing, a rotary valve mounted therein and adapted to be shifted longitudinally said rotatably valve member having a plurality of combustion chambers or compartments one for each cylinder, said compartments adapted to communicate at any position with their respective cylinders, said communication being provided by means of a series of radial peripheral ports in said rotary valve member, and a series of bridged ports in said valve casing, said ports leading into said cylinders combustion chambers, said casing having a series of intake ports and a series of exhaust ports, each set of series to be in line longitudinally, opposite series to be in line transversely and disposed on the inner circumference of said valve casing about 120° apart at their centers, each series leading into their respective intake or exhaust manifold, said valve having mounted thereon split expansive rings, said rings having laps at the split and a port in line with said laps, said rings being rotatable with said valve members, said valve member having similar ports coöperating with said ring ports at any rotating position of said valve member.

9. In a four cycle reciprocating combustion engine, the combination with a series of cylinders, with pistons operating therein and an additional two cycle air cylinder, with a piston operative therein, a valve casing, a rotary valve mounted therein and adapted to be shifted longitudinally, said rotatable valve having mounted thereon to rotate therewith, a plurality split expansive rings, said rings each having a lap and a port in line with said lap, one of said rings being provided for each cylinder, said valve casing having inlet and exhaust ports arranged about 120° apart, said rings registering alternately and in different degrees of rotation, according to said end shift of said valve member, with their respective inlet and exhaust ports, means in connection with said valve to control the inflow and discharge of air both to and from said air pump; said means including two peripheral segmental ports in said valve about 180° apart at their centers, each port controlling the two piston cycles alternately by registering with additional ports in said valve casing.

10. In a reciprocating combustion engine, the combination with a series of cylinders and pistons operating therein and a rotatable valve member and a magneto igniter thereon, of two plugs inserted in said rotatable valve member, each plug having a spirally curved edge portion; means for shifting said rotatable valve member in a longitudinal direction; a small sprocket adapted to drive said magneto armature, a large sprocket connected to said valve member by said plugs; driving connections between the larger and smaller sprockets, said large sprocket being rotated by the engagement of said inserted plugs, said shift of the larger sprocket being for the purpose of advancing or retarding the rotation of said magneto armature, the change in position of the magneto armature being double the movement of the larger sprocket, due to the difference in size between said sprockets.

11. In a reciprocating combustion engine, the combination with a series of cylinders and pistons operating therein and a rotatable valve member and a magneto igniter thereon, of an ignition advancing and retarding means, including a reduced portion on said valve member, a large sprocket having a snug rotatable fit on said reduced portion of said valve member, said sprocket having two internal spiral grooves, said sprocket being held in a longitudinal alinement by suitable end thrust bearings plugs with spiral edges having a tight fit in said reduced portion of said valve member, the spiral ends of said plugs extending beyond the reduced portion of said valve member into said internal grooves, in said sprocket, said plugs being in transverse alinement and rotatable with said valve member and movable in said internal sprocket grooves, a smaller sprocket to drive the magneto armature shaft and connections with said large sprocket, thereby increasing any rotating shift given said large sprocket, thus producing an increased advance and retard range of the magneto armature over any shift given said large sprocket.

12. In a reciprocating combustion engine, the combination with a series of cylinders and pistons operating therein, a magneto igniter and a rotatable and shiftable valve member thereon, of a means whereby said magneto igniter may be advanced or retarded according to said end shift of said rotatable valve member, including a small sprocket adapted to be attached to said magneto armature; a large sprocket rotatably mounted on said valve member; means for connecting said small and large sprockets, means for shifting said large sprocket rotatably to advance or retard the spark, including the provision of two internal spiral grooves in said sprocket, two spiral plugs inserted in said valve member, being in line transversely and engaging said groove, said large sprocket being advanced or retarded in rotation, according to said end shift of said rotatable valve member, said smaller sprocket and magneto armature being rotatably advanced or retarded an increased amount over said advance or retard of said large sprocket and due to the difference in size of said sprockets.

FRANK D. BUTLER.

Witnesses:
S. L. HEAPS,
P. F. CARSPECKEN.